United States Patent
Gabbay et al.

(10) Patent No.: US 9,582,440 B2
(45) Date of Patent: Feb. 28, 2017

(54) CREDIT BASED LOW-LATENCY ARBITRATION WITH DATA TRANSFER

(71) Applicant: Mellanox Technologies Ltd., Yokneam (IL)

(72) Inventors: Freddy Gabbay, Givataim (IL); Amiad Marelli, Tel Aviv (IL); Alon Webman, Tel Aviv (IL); Zachy Haramaty, Hemed (IL)

(73) Assignee: Mellanox Technologies Ltd., Yokneam (IL)

( * ) Notice: Subject to any disclaimer, the term of this patent is extended or adjusted under 35 U.S.C. 154(b) by 235 days.

(21) Appl. No.: 13/763,676

(22) Filed: Feb. 10, 2013

(65) Prior Publication Data
US 2014/0229645 A1    Aug. 14, 2014

(51) Int. Cl.
*G06F 13/364* (2006.01)

(52) U.S. Cl.
CPC .................. *G06F 13/364* (2013.01)

(58) Field of Classification Search
CPC ........ H04L 47/10; H04L 47/21–47/215; H04L 47/39; H04L 47/50–47/52; H04L 47/527; G06F 13/36; G06F 13/364; G06F 13/366; G06F 13/368
See application file for complete search history.

(56) References Cited

U.S. PATENT DOCUMENTS

| | | | |
|---|---|---|---|
| 5,367,520 A | | 11/1994 | Cordell |
| 5,440,752 A | * | 8/1995 | Lentz .................. G06F 12/0813 710/123 |
| 5,574,885 A | | 11/1996 | Denzel et al. |
| 5,802,057 A | * | 9/1998 | Duckwall ......... H04L 12/40058 370/408 |
| 5,924,119 A | * | 7/1999 | Sindhu ................ G06F 12/0831 711/119 |
| 6,160,814 A | | 12/2000 | Ren et al. |
| 6,169,741 B1 | | 1/2001 | LeMaire et al. |

(Continued)

FOREIGN PATENT DOCUMENTS

| | | |
|---|---|---|
| EP | 1698976 A1 | 9/2006 |
| WO | 03024033 A1 | 3/2003 |

OTHER PUBLICATIONS

Concer, N.; Bononi, L.; Soulie, M.; Locatelli, R.; Carloni, L.P., "The Connection-Then-Credit Flow Control Protocol for Heterogeneous Multicore Systems-on-Chip," Computer-Aided Design of Integrated Circuits and Systems, IEEE Transactions on , vol. 29, No. 6, pp. 869,882, Jun. 2010.*

(Continued)

*Primary Examiner* — Nimesh G Patel
(74) *Attorney, Agent, or Firm* — D. Kligler IP Services Ltd.

(57) ABSTRACT

An apparatus includes multiple data sources and arbitration circuitry. The data sources are configured to send to a common destination data items and respective arbitration requests, such that the data items are sent to the destination regardless of receiving any indication that the data items were served to the destination in response to the respective arbitration requests. The arbitration circuitry is configured to receive and buffer the data items, to perform arbitration on the buffered data items responsively to the arbitration requests, and to serve the buffered data items to the destination in accordance with the arbitration.

21 Claims, 1 Drawing Sheet

(56) References Cited

U.S. PATENT DOCUMENTS

| | | | |
|---|---|---|---|
| 6,195,721 B1* | 2/2001 | Rice | G06F 13/4027 709/201 |
| 6,314,487 B1* | 11/2001 | Hahn | G06F 13/364 370/351 |
| 6,438,130 B1 | 8/2002 | Kagan et al. | |
| 6,456,590 B1 | 9/2002 | Ren et al. | |
| 6,463,484 B1 | 10/2002 | Moss | |
| 6,535,963 B1 | 3/2003 | Rivers | |
| 6,539,024 B1 | 3/2003 | Janoska et al. | |
| 6,606,666 B1 | 8/2003 | Bell et al. | |
| 6,687,256 B2 | 2/2004 | Modali et al. | |
| 6,700,871 B1 | 3/2004 | Harper et al. | |
| 6,788,701 B1 | 9/2004 | Mahalingaiah et al. | |
| 6,831,918 B1 | 12/2004 | Kavak | |
| 6,895,015 B1 | 5/2005 | Chiang et al. | |
| 6,922,408 B2 | 7/2005 | Bloch et al. | |
| 7,088,713 B2 | 8/2006 | Battle et al. | |
| 7,136,381 B2 | 11/2006 | Battle et al. | |
| 7,243,177 B1 | 7/2007 | Davis et al. | |
| 7,327,749 B1 | 2/2008 | Mott | |
| 7,590,058 B1 | 9/2009 | Cherchali et al. | |
| 7,609,636 B1 | 10/2009 | Mott | |
| 7,650,424 B2 | 1/2010 | Armitage | |
| 7,724,760 B2* | 5/2010 | Balakrishnan et al. | 370/416 |
| 7,773,622 B2 | 8/2010 | Schmidt et al. | |
| 7,796,629 B1* | 9/2010 | MacAdam et al. | 370/422 |
| 7,853,738 B2 | 12/2010 | Pothireddy et al. | |
| 7,936,770 B1 | 5/2011 | Frattura et al. | |
| 8,014,288 B1* | 9/2011 | MacAdam | 370/235.1 |
| 8,149,710 B2 | 4/2012 | Bergamasco et al. | |
| 8,175,094 B2 | 5/2012 | Bauchot et al. | |
| 8,270,295 B2 | 9/2012 | Kendall et al. | |
| 8,274,971 B2 | 9/2012 | Battle et al. | |
| 8,570,916 B1* | 10/2013 | Tang et al. | 370/282 |
| 8,660,137 B2* | 2/2014 | Aloni et al. | 370/451 |
| 2001/0023469 A1* | 9/2001 | Jeong | G06F 13/364 710/241 |
| 2002/0012340 A1 | 1/2002 | Kalkunte et al. | |
| 2002/0027908 A1 | 3/2002 | Kalkunte et al. | |
| 2002/0039357 A1 | 4/2002 | Lipasti et al. | |
| 2003/0026287 A1 | 2/2003 | Mullendore et al. | |
| 2003/0048792 A1 | 3/2003 | Xu et al. | |
| 2003/0053474 A1 | 3/2003 | Tuck et al. | |
| 2003/0076849 A1 | 4/2003 | Morgan et al. | |
| 2003/0095560 A1 | 5/2003 | Arita et al. | |
| 2003/0118016 A1 | 6/2003 | Kalkunte et al. | |
| 2003/0137939 A1 | 7/2003 | Dunning et al. | |
| 2003/0198231 A1 | 10/2003 | Kalkunte et al. | |
| 2003/0198241 A1 | 10/2003 | Putcha et al. | |
| 2003/0200330 A1 | 10/2003 | Oelke et al. | |
| 2004/0008716 A1 | 1/2004 | Stiliadis | |
| 2004/0066785 A1 | 4/2004 | He et al. | |
| 2004/0090974 A1* | 5/2004 | Balakrishnan et al. | 370/412 |
| 2005/0259574 A1 | 11/2005 | Figueira et al. | |
| 2006/0155938 A1 | 7/2006 | Cummings et al. | |
| 2006/0159104 A1 | 7/2006 | Nemirovsky et al. | |
| 2006/0182112 A1 | 8/2006 | Battle et al. | |
| 2007/0025242 A1 | 2/2007 | Tsang | |
| 2007/0038829 A1* | 2/2007 | Tousek | G06F 13/1663 711/167 |
| 2007/0070901 A1* | 3/2007 | Aloni et al. | 370/230 |
| 2007/0201497 A1 | 8/2007 | Krishnamurthy | |
| 2008/0031269 A1 | 2/2008 | Shimizu et al. | |
| 2008/0043768 A1 | 2/2008 | Lopez et al. | |
| 2009/0003212 A1 | 1/2009 | Kwan et al. | |
| 2009/0010162 A1 | 1/2009 | Bergamasco et al. | |
| 2009/0161684 A1 | 6/2009 | Voruganti et al. | |
| 2010/0100670 A1 | 4/2010 | Jeddeloh | |
| 2011/0058571 A1 | 3/2011 | Bloch et al. | |
| 2011/0075555 A1* | 3/2011 | Ziegler | 370/229 |
| 2011/0286468 A1 | 11/2011 | Tomonaga et al. | |
| 2012/0002678 A1 | 1/2012 | Jonsson et al. | |
| 2012/0105637 A1 | 5/2012 | Yousefi et al. | |
| 2013/0028256 A1 | 1/2013 | Koren et al. | |
| 2013/0077489 A1 | 3/2013 | Bloch et al. | |
| 2015/0363166 A1* | 12/2015 | Christidis | G06F 5/14 710/117 |

OTHER PUBLICATIONS

Radulescu, A.; Dielissen, J.; Pestana, S.G.; Gangwal, O.P.; Rijpkema, E.; Wielage, P.; Goossens, K., "An efficient on-chip NI offering guaranteed services, shared-memory abstraction, and flexible network configuration," Computer-Aided Design of Integrated Circuits and Systems, IEEE Transactions on , vol. 24, No. 1, pp. 4,17, Jan. 2005.*

U.S. Appl. No. 12/876,265 Office Action dated May 1, 2013.

Raatikainen, P., "ATM Switches—Switching Technology S38. 3165", Switching Technology, L8-1, 34 pages, year 2006 (http://www.netlab.hut.fi/opetus/s383165).

Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).

U.S. Appl. No. 13/189,593 Office Action dated Jul. 9, 2013.

Cisco Nexus 3548 and 3524 Switches Data Sheet, Cisco Nexus 3000 Series Switches Overview, Cisco systems Inc., San Jose, California, pp. 1-14, 2013.

U.S. Appl. No. 14/046,976, filed Oct. 6, 2013.

U.S. Appl. No. 13/802,926, filed Mar. 14, 2013.

U.S. Appl. No. 13/972,968, filed Aug. 22, 2013.

Infiniband Trade Association, "Infiniband Architecture Specification", vol. 1, release 1.2.1, Nov. 2007.

IEEE Std 802.3™-2008/Cor Jan. 2009, "IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Corrigendum 1: Timing Considerations for PAUSE Operation", 12 pages, Dec. 9, 2009.

Desanti, C., "802.1Qbb—IEEE Standard for Local and Metropolitan Area Networks—Virtual Bridged Local Area Networks—Amendment: Priority-based Flow Control", Sep. 14, 2008.

U.S. Appl. No. 13/972,968 Office Action dated Apr. 8, 2015.

U.S. Appl. No. 13/972,968 Office Action dated Oct. 22, 2015.

U.S. Appl. No. 13/972,968 Office Action dated Apr. 8, 2016.

U.S. Appl. No. 13/972,968 Office Action dated Nov. 29, 2016.

* cited by examiner

CREDIT BASED LOW-LATENCY ARBITRATION WITH DATA TRANSFER

FIELD OF THE INVENTION

The present invention relates generally to data processing, and particularly to methods and systems for data arbitration.

BACKGROUND OF THE INVENTION

Data arbitration schemes are used in various systems and applications in which multiple data producers or consumers contend for access to a shared resource. For example, some network switches perform arbitration of communication packets provided by multiple sources for transmission via a common output port.

SUMMARY OF THE INVENTION

An embodiment of the present invention that is described herein provides an apparatus includes multiple data sources and arbitration circuitry. The data sources are configured to send to a common destination data items and respective arbitration requests, such that the data items are sent to the destination regardless of receiving any indication that the data items were served to the destination in response to the respective arbitration requests. The arbitration circuitry is configured to receive and buffer the data items, to perform arbitration on the buffered data items responsively to the arbitration requests, and to serve the buffered data items to the destination in accordance with the arbitration.

In some embodiments, the data sources are configured to send each data item simultaneously with a corresponding arbitration request for the data item. In an embodiment, the data sources are configured to send the data items in accordance with remaining credit indicated by respective credit counters coupled to the data sources, and the arbitration circuitry is configured to send to a given data source a credit update upon serving a buffered data item received from the given data source.

In some embodiments, the arbitration circuitry includes multiple First-In First-Out (FIFO) memories for buffering the data items, and an arbiter that is configured to perform arbitration on the data items buffered in the FIFO memories. In a disclosed embodiment, a size of each FIFO memory depends on a round-trip delay between the data sources and the destination, plus an arbitration processing time of the arbitration circuitry.

In another embodiment, the arbitration circuitry is configured to send to the data sources arbitration grants upon scheduling the respective arbitration requests, and the data sources are configured to send the data items irrespective of the arbitration grants. In yet another embodiment, a given data source is configured to divide a data item into multiple data chunks, to send the data chunks separately to the destination but to send a single arbitration request for the entire data item.

In some embodiments, the data sources include input ports of a network switch, and the common destination includes an output port of the network switch. In other embodiments, the common destination includes an output port of a Network Interface Card (NIC). In an embodiment, the data sources and the destination are includes in a single Integrated Circuit (IC).

There is additionally provided, in accordance with an embodiment of the present invention, a method including sending data items and respective arbitration requests from multiple data sources to a common destination, such that the data items are sent to the destination regardless of receiving at the data sources any indication that the data items were served to the destination in response to the respective arbitration requests. The data items are buffered, and arbitration is performed on the buffered data items responsively to the arbitration requests. The buffered data items are served to the destination in accordance with the arbitration.

There is also provided, in accordance with an embodiment of the present invention, a network switch including multiple input ports and arbitration circuitry. The input ports are configured to send to an output port data items and respective arbitration requests, such that the data items are sent to the output port regardless of receiving any indication that the data items were served to the output port in response to the respective arbitration requests. The arbitration circuitry is configured to receive and buffer the data items, to perform arbitration on the buffered data items responsively to the arbitration requests, and to serve the buffered data items to the output port in accordance with the arbitration.

The present invention will be more fully understood from the following detailed description of the embodiments thereof, taken together with the drawings in which:

DETAILED DESCRIPTION OF EMBODIMENTS

Overview

In various data processing applications, multiple data sources send data items to a common destination that is able to receive only a single data item at a time. A network switch, for example, may send communication packets from multiple input ports to a certain output port. The data items may be served to the destination one at a time using a suitable arbitration scheme.

In many practical implementations, however, the propagation delay between the data sources and the destination is large. Conventional arbitration schemes, in which the data sources exchange arbitration requests and grants with the arbiter before sending the data items, are highly inefficient in the presence of large propagation delays.

Embodiments of the present invention that are described herein provide improved methods and systems for arbitration and flow control, which are particularly suitable for large propagation delays between the data sources and the destination. In the disclosed embodiments, the data sources send the arbitration requests together with the data items, without waiting for arbitration grants.

Arbitration circuitry, which is associated with the common destination, receives and buffers the data items, and serves the buffered data items to the destination in accordance with a suitable arbitration scheme. The arbitration circuitry may comprise, for example, multiple First-In First-Out memories (FIFOs) for buffering the data items arriving from the respective data sources. The arbitration circuitry may send arbitration grants to the data sources upon serving the data items, but the data sources typically use the grants for internal management and not as a condition for sending the data items.

In some embodiments, the data sources and the arbitration circuitry use a credit-based flow control mechanism for regulating the transfer of data items. The credit-based flow control mechanism is typically decoupled from the arbitration scheduling.

By sending the data items together with the arbitration requests, the end-to-end latency of processing the data items is reduced considerably. As a result, performance figures such as delay and throughput can be improved considerably.

System Description

Figure 1:
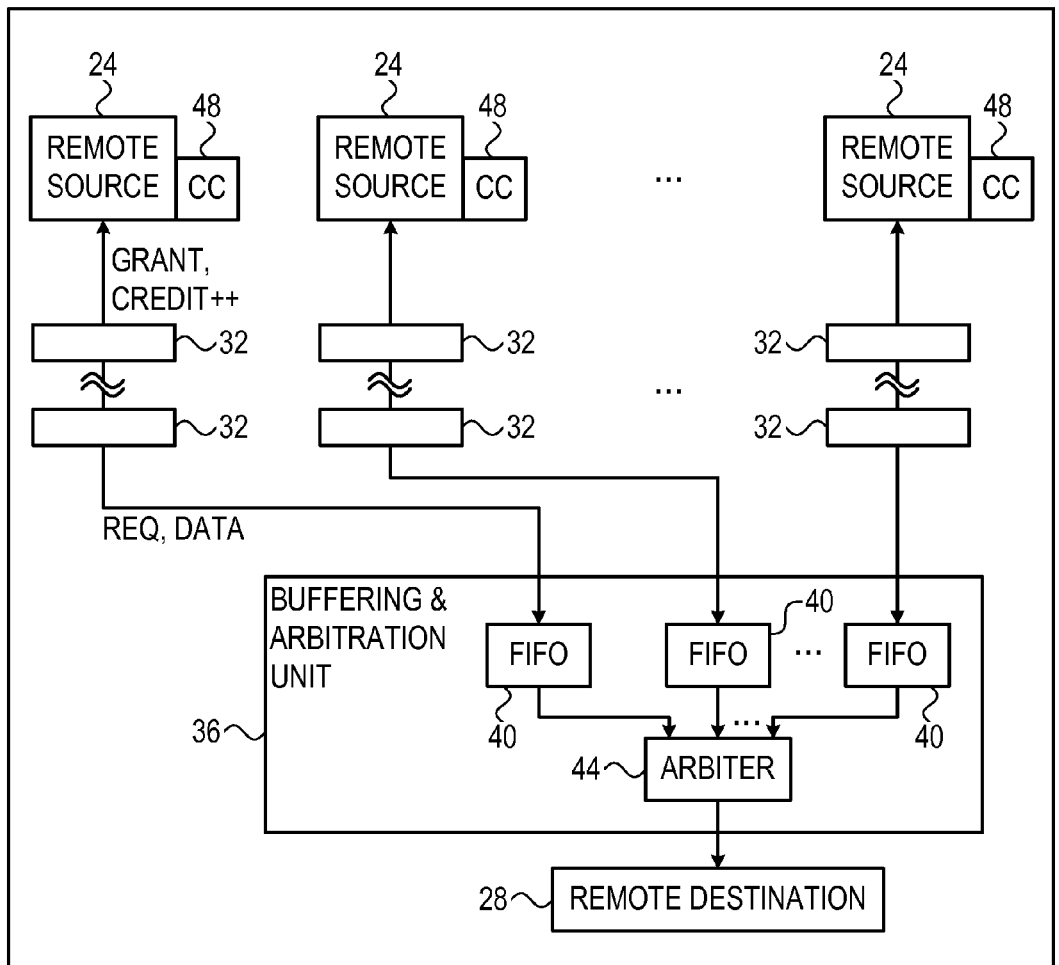
FIG. 1 is a block diagram that schematically illustrates an Integrated Circuit (IC) that uses low-latency arbitration, in accordance with an embodiment of the present invention.

FIG. 1 is a block diagram that schematically illustrates an Integrated Circuit (IC) 20 that uses low-latency arbitration, in accordance with an embodiment of the present invention. IC 20 comprises multiple data sources 24 that send data to a common destination 28. IC 20 comprises circuitry that applies efficient arbitration and flow control to the data items arriving from sources 24, as will be explained in detail below.

In the embodiments described herein, IC 20 comprises a network switch IC, sources 24 comprise input ports of the switch, destination 28 comprises an output port of the switch, and the data comprises packets or messages that are forwarded from the input ports to the output port. Alternatively, however, the disclosed techniques can be used in any other suitable device or system in which multiple sources send data to a common destination, such as in Network Interface Cards (NICs).

In the present example, the propagation delay between sources 24 and destination 28 in IC 20 is large, e.g., on the order of ten to thirty clock cycles. This delay may be due to various reasons, such as because of registers, buffers, samplers, multiplexers or other circuit elements traversed by the data along the route. In the present example, the data exchanged between the sources and destination is sampled along the route by one or more samplers 32 in order to meet the clock frequency and timing requirements.

In some embodiments, IC 20 comprises a buffering and arbitration unit 36, which buffers the data arriving from sources 24, performs arbitration over the buffered data, and serves the arbitrated data to destination 28. In the example of FIG. 1, unit 36 comprises multiple First-In First-Out memories (FIFOs) 40 and an arbiter 44. FIFOs 40 are assigned respectively to sources 24, one FIFO assigned to buffer the data items arriving from each source. Each FIFO entry comprises a chunk of data that is transferred by the corresponding source in a single transfer cycle. Arbiter 44 performs arbitration over the data items at the outputs of FIFOs 40, and serves the arbitrated data items to destination 28. Arbiter 44 may carry out any suitable arbitration scheme, such as Round Robin, strict priority, or any other suitable scheme.

In some embodiments, unit 36 uses a credit-based mechanism to control the flow of data items from sources 24. In these embodiments, each source 24 maintains a respective Credit Counter (CC) 48 that holds the current credit available to the source for sending data items. The source sends the next data item only if there is sufficient credit remaining in its CC. The source decrements the CC for each sent data item.

When a data item is removed from the corresponding FIFO 40 in unit 36 and served to destination 28, unit 36 sends a credit update ("CREDIT++") back to the source. The credit update may be implemented, for example, using a signal that can be asserted and de-asserted by unit 36, or using a dedicated message. Upon receiving the credit update, the source increments the CC. The credit updates may undergo similar sampling or other processing (and thus similar delay) as the data items.

The credit-based flow control mechanism between sources 24 and unit 36 is typically decoupled from the arbitration mechanism: Data items are transferred from sources 24 to FIFOs 40 regardless of the arbitration resolution.

The IC configuration shown in FIG. 1 is an example configuration, which is chosen purely for the sake of conceptual clarity. In alternative embodiments, any other suitable IC configuration can be used. For example, in FIG. 1 unit 36 is shown as a single integrated unit that is located adjacent to destination 28. In alternative embodiments, the elements of unit 36 may be distributed among any desired number of locations in the IC, not necessarily adjacent to the destination. The arbitration unit is thus also referred to as arbitration circuitry, since its elements are not necessarily collocated in a single physical unit or location. In a network switch implementation (in which destination 28 comprises an output port), unit 36 is typically duplicated per output port.

The elements of IC 20 may be implemented using hardware/firmware, such as in an Application-Specific Integrated Circuit (ASIC) or Field-Programmable Gate Array (FPGA). Alternatively, some IC elements may be implemented in software or using a combination of hardware/firmware and software elements. For example, the arbiter may be implemented by triggering an interrupt to a Central Processing Unit (CPU) that carries out the arbitration policy in software or firmware.

Credit-Based Low-Latency Arbitration

The long propagation delay in IC 20 between sources 24 and destination 28 may cause considerable performance degradation unless accounted for. Consider, for example, a scheme in which each source sends an arbitration request for each data item, and sends the data item to the destination only after receiving an arbitration grant from the arbiter. The arbitration request and grant are typically subject to the same propagation delay as the data.

In such a scheme, each data item is delayed by at least three times the propagation delay between the source and destination (one propagation delay for sending the arbitration request, another for receiving the arbitration grant, and another for sending the data item). When the propagation delay is large, this sort of solution will degrade the latency and throughput performance of the IC considerably.

In some embodiments, the disclosed techniques overcome the long propagation delay by sending each data item together with the corresponding arbitration request. The term "together" can mean in the same message or in separate messages but within a small time frame. In any case, source 24 sends the data without waiting for an arbitration grant. FIFOs 40 buffer the data items received from the respective sources 24, and arbiter 44 arbitrates the data items buffered in the FIFos. (When a certain FIFO is empty, unit 36 may bypass the FIFO and serve an incoming data item directly to the arbiter.)

Unit 36 typically sends an arbitration grant for each data item that is served to the destination, but sources 24 do not use the arbitration grants as a condition for sending the data. Therefore, a data item will typically be sent from the source, and arrive in unit 36, before the source has received the arbitration grant for that data item.

When using the above scheme, the propagation delay of the arbitration request is concurrent with the propagation delay of the data. Moreover, the propagation delay of the arbitration grant and the arbitration processing time do not affect the total delay. As a result, the total delay applied to the data is shortened considerably and the IC performance is therefore improved. In a network switch application, for example, the switch latency is reduced and data throughput (bandwidth) is increased.

The size of FIFOs 40 is typically determined by the round-trip delay between sources 24 and destination 28, plus the maximum or average arbitration processing time of arbiter 44. In a typical application, FIFOs 40 are small, e.g., on the order of 10-100 entries. Unlike conventional output buffers of network switches, FIFOs 40 are not required to account for data congestion or other network effects, and their sole purpose is to account for the round-trip delay and arbitration processing within the IC.

Figure 2:
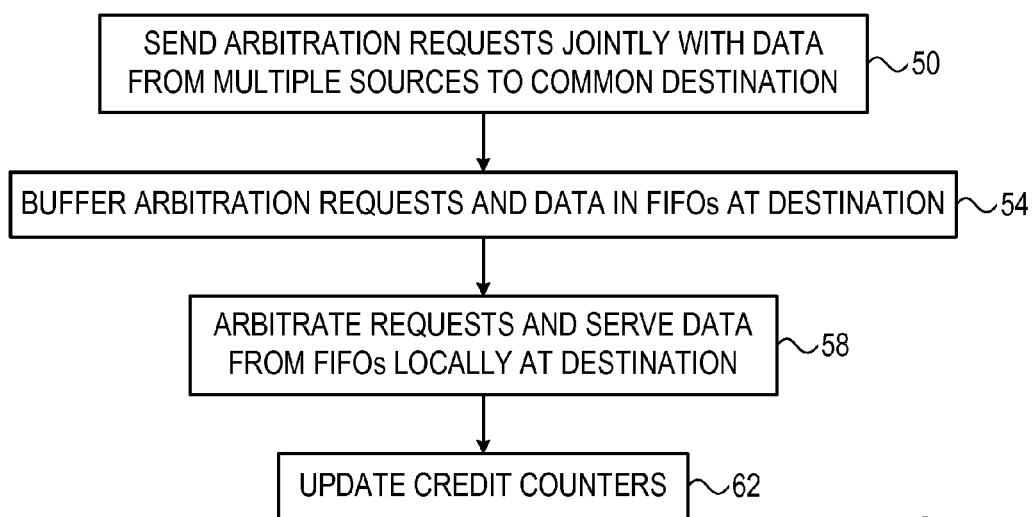
FIG. 2 is a flow chart that schematically illustrates a method for low-latency arbitration, in accordance with an embodiment of the present invention.

FIG. 2 is a flow chart that schematically illustrates a method for low-latency arbitration, in accordance with an embodiment of the present invention. The method begins with sources 24 sending data items to destination 28, at a data sending step 50. Each data item is sent jointly with the corresponding arbitration request.

FIFOs 40 in unit 36 buffer the data items and arbitration requests, at a buffering step 54. Arbiter 44 arbitrates the buffered data items in accordance with the arbitration requests, at an arbitration step 58. In some embodiments, for each data item that is served to destination 28, unit 36 sends an arbitration grant to the corresponding source. Unit 36 sends credit updates to sources 24, one credit update per each data item that is served to destination 28, and the sources update their credit counters accordingly, at a credit update step 62.

Additional Variations

In some embodiments, unit 36 uses the received data items themselves as implicit arbitration requests, without a need for sources 24 to send explicit arbitration requests together with the data items.

In some embodiments, a given source 24 divides a data item (e.g., packet) into multiple data chunks. The data chunks are sent separately and buffered separately in FIFO 40, but the entire data item is arbitrated and served en-bloc to destination 28. In this embodiment, the source sends a single arbitration request for the entire data item, usually together with the first chunk. In response, unit 36 returns a single arbitration grant.

In some embodiments, the credit-based flow control mechanism eliminates the need for arbitration grants. In these embodiments, unit 36 does not send arbitration grants, and the transfer of data items is managed exclusively using the credit mechanism. In alternative embodiments, unit 36 sends arbitration grants, which the sources use for internal status monitoring or other management purposes.

Although the embodiments described herein mainly address network switches, e.g., for Infiniband or Ethernet networks, the methods and systems described herein can also be used in other applications that involve sending data from multiple sources to a common destination. For example, in some NICs (e.g., Infiniband Host Channel Adapters (HCAs)) data is gathered from multiple sources for sending over an output port. Although the embodiments described herein refer mainly to implementation within a single IC, the disclosed techniques are not limited to single-IC applications, and can be used, for example, at the device, board or system level.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
    multiple data sources, which are configured to send to a common destination data items together with respective arbitration requests in separate messages, such that the data items are sent to the destination regardless of receiving any response to the respective arbitration requests; and
    arbitration circuitry, which is configured to receive and buffer the data items, to perform arbitration on the buffered data items responsively to the arbitration requests, and to serve the buffered data items to the destination in accordance with the arbitration,
    wherein the multiple data sources are configured to send some of the data items with respective separate arbitration requests relating to multiple data items,
    wherein the arbitration circuitry is configured to send to the data sources arbitration grants upon scheduling the respective arbitration requests, and wherein the data sources are configured to send the data items irrespective of the arbitration grants.

2. The apparatus according to claim 1, wherein the data sources are configured to send the data items in accordance with remaining credit indicated by respective credit counters coupled to the data sources, and wherein the arbitration circuitry is configured to send to a given data source a credit update upon serving a buffered data item received from the given data source.

3. The apparatus according to claim 1, wherein the arbitration circuitry comprises multiple First-In First-Out (FIFO) memories for buffering the data items, and an arbiter that is configured to perform arbitration on the data items buffered in the FIFO memories.

4. The apparatus according to claim 3, wherein a size of each FIFO memory depends on a round-trip delay between the data sources and the destination, plus an arbitration processing time of the arbitration circuitry.

5. The apparatus according to claim 1, wherein a given data source is configured to divide a data item into multiple data chunks, to send the data chunks separately to the destination but to send a single arbitration request for the entire data item.

6. The apparatus according to claim 1, wherein the data sources comprise input ports of a network switch, and wherein the common destination comprises an output port of the network switch.

7. The apparatus according to claim 1, wherein the common destination comprises an output port of a Network Interface Card (NIC).

8. The apparatus according to claim 1, wherein the data sources and the destination are comprised in a single Integrated Circuit (IC).

9. The apparatus according to claim 1, wherein the multiple data sources are configured to send some of the data items to the destination without a respective arbitration request.

10. The apparatus according to claim 1, wherein a first one of the multiple data sources is configured to receive a data item, to divide the data item into multiple data chunks, to send a single arbitration request in a separate message from the data chunks, for the entire data item and to send the data chunks separately to the arbitration circuitry, regardless of whether a response to the arbitration request was received.

11. The apparatus according to claim 10, wherein the single arbitration request is sent with a first one of the multiple data chunks, sent first to the arbitration circuitry.

12. A method, comprising:
sending data items together with respective arbitration requests in separate messages from multiple data sources to a common destination, such that the data items are sent to the destination regardless of receiving at the data sources any response to the respective arbitration requests; and
buffering the data items and performing arbitration on the buffered data items responsively to the arbitration requests; and
serving the buffered data items to the destination in accordance with the arbitration,
wherein performing the arbitration comprises sending to the data sources arbitration grants upon scheduling the respective arbitration requests, and wherein sending the data items comprises transmitting the data items from the data sources irrespective of the arbitration grants.

13. The method according to claim 12, wherein sending the data items comprises transmitting the data items in accordance with remaining credit indicated by respective credit counters coupled to the data sources, and comprising sending to a given data source a credit update upon serving a buffered data item received from the given data source.

14. The method according to claim 12, wherein buffering the data items comprises storing the data items in multiple First-In First-Out (FIFO) memories, and wherein performing the arbitration comprises arbitrating the data items buffered in the FIFO memories.

15. The method according to claim 14, wherein a size of each FIFO memory depends on a round-trip delay between the data sources and the destination, plus an arbitration processing time incurred in performing the arbitration.

16. The method according to claim 12, wherein sending the data items comprises dividing a data item into multiple data chunks, sending the data chunks separately to the destination but sending a single arbitration request for the entire data item.

17. The method according to claim 12, wherein the data sources comprise input ports of a network switch, and wherein the common destination comprises an output port of the network switch.

18. The method according to claim 12, wherein the common destination comprises an output port of a Network Interface Card (NIC).

19. The method according to claim 12, wherein the data sources and the destination are comprised in a single Integrated Circuit (IC).

20. The method according to claim 12, wherein sending the data items comprises sending some of the data items with respective arbitration requests relating to multiple data items.

21. A network switch, comprising:
multiple input ports, which are configured to send to an output port data items together with respective arbitration requests in separate messages, such that the data items are sent to the output port regardless of receiving any response to the respective arbitration requests; and
arbitration circuitry, which is configured to receive and buffer the data items, to perform arbitration on the buffered data items responsively to the arbitration requests, and to serve the buffered data items to the output port in accordance with the arbitration,
wherein the arbitration circuitry is configured to send to the input ports arbitration grants upon scheduling the respective arbitration requests, and wherein the input ports are configured to send the data items irrespective of the arbitration grants.

* * * * *